(12) United States Patent  (10) Patent No.: US 10,960,849 B2
Tieman  (45) Date of Patent: Mar. 30, 2021

(54) REMOTE CONTROL BUTTON ACTUATOR WITH REMOVABLE TRAY

(71) Applicant: Blue Eclipse, LLC, Noblesville, IN (US)

(72) Inventor: Craig A. Tieman, Noblesville, IN (US)

(73) Assignee: Blue Eclipse, LLC, Noblesville, IN (US)

( * ) Notice: Subject to any disclaimer, the term of this patent is extended or adjusted under 35 U.S.C. 154(b) by 0 days.

(21) Appl. No.: 16/536,758

(22) Filed: Aug. 9, 2019

(65) Prior Publication Data

US 2020/0055487 A1 Feb. 20, 2020

Related U.S. Application Data

(60) Provisional application No. 62/718,699, filed on Aug. 14, 2018.

(51) Int. Cl.
*B60R 25/24* (2013.01)
*H01H 13/14* (2006.01)
(Continued)

(52) U.S. Cl.
CPC ............... *B60R 25/24* (2013.01); *G06T 7/70* (2017.01); *H01H 13/04* (2013.01); *H01H 13/14* (2013.01); *B60R 25/10* (2013.01); *B60R 25/209* (2013.01)

(58) Field of Classification Search
CPC ....... B60R 25/24; B60R 25/10; B60R 25/209; B60R 16/0233; B60R 2325/205; G06T 7/70; H01H 13/04; H01H 13/14
(Continued)

(56) References Cited

U.S. PATENT DOCUMENTS 4,897,630 A * 1/1990 Nykerk .................. B60R 25/04
340/309.16
6,362,771 B1 * 3/2002 Schofield ........... G07C 9/00182
296/37.8

(Continued)

FOREIGN PATENT DOCUMENTS

EP 3279882 A1 2/2018
WO 2006084330 A1 8/2006

OTHER PUBLICATIONS

Extended European Search Report for European Patent Application No. 19191507.3 dated Dec. 11, 2019.

*Primary Examiner* — Edwin C Holloway, III
(74) *Attorney, Agent, or Firm* — Andrus Intellectual Property Law, LLP (57) ABSTRACT

An actuation system used to actuate one or more buttons on a remote control device, such as a key fob of a vehicle, based upon commands generated from a mobile device, such as a smartphone. The actuation system includes a key fob drawer that defines an isolation enclosure that prevents RF signals from entering into or leaving the isolation enclosure. A controller receives the command signals from the mobile device and converts the command signals into position commands that are used to activate a button actuator to move a plunger into alignment with one of the buttons on the key fob. The button actuator moves the plunger into contact with one of the buttons which generates an RF signal from the key fob. The key fob is contained in the isolation enclosure and the system includes a RF receiver and transmitter to re-transmit vehicle command signal for receipt by the vehicle.

20 Claims, 5 Drawing Sheets

(51) Int. Cl.
*G06T 7/70* (2017.01)
*H01H 13/04* (2006.01)
*B60R 25/10* (2013.01)
*B60R 25/20* (2013.01)

(58) Field of Classification Search
USPC ............ 340/5.51, 5.72, 429, 426.15, 426.16,
340/426.18, 426.36
See application file for complete search history.

(56) References Cited

U.S. PATENT DOCUMENTS

| | | | |
|---|---|---|---|
| 6,781,507 B1* | 8/2004 | Birchfield | B60R 25/04 340/10.1 |
| 9,409,297 B2* | 8/2016 | Tieman | B25J 9/023 |
| 9,576,414 B2* | 2/2017 | Tieman | G06F 9/451 |
| 2003/0112121 A1* | 6/2003 | Wilson | G07C 9/00182 340/5.61 |
| 2003/0227382 A1* | 12/2003 | Breed | G06Q 20/203 340/539.13 |
| 2004/0227615 A1* | 11/2004 | John | B60R 25/04 340/5.61 |
| 2004/0257200 A1* | 12/2004 | Baumgardner | G07C 9/00182 340/5.72 |
| 2006/0132286 A1* | 6/2006 | Huntzicker | B60R 25/24 340/5.64 |
| 2007/0096938 A1* | 5/2007 | Lopez | G08C 17/02 340/12.22 |
| 2015/0174765 A1* | 6/2015 | Tieman | B25J 13/006 701/2 |
| 2016/0343190 A1* | 11/2016 | Tieman | G07C 9/00309 |
| 2017/0318140 A1* | 11/2017 | Sinha | H04B 17/00 |

* cited by examiner

REMOTE CONTROL BUTTON ACTUATOR WITH REMOVABLE TRAY

CROSS REFERENCE TO RELATED APPLICATIONS

The present application is based on and claims priority to U.S. Provisional Patent Application Ser. No. 62/718,699, filed Aug. 14, 2019, the disclosure of which is incorporated herein by reference.

BACKGROUND

Electronic systems in automotive vehicles and other devices may utilize handheld remote controls with finger-pressable buttons. These devices can be utilized to remotely actuate vehicle or device functions by hand, where such functions may be difficult to access otherwise by a vehicle operator. The remote controls of these electronic systems generally permit secure remote actuation of unlocking, locking, power door and trunk opening, remote engine starting, activation of horns, lights and panic features as well as other types of vehicle or device functions.

In recent years, the rapid and widespread growth in long-range wireless connectivity and sophisticated hand-held mobile devices with touch-type graphical user interfaces and short or long-range wireless connectivity has led to the proliferation of machine-to-machine connectivity solutions and "anywhere at any time" device interactivity. Consumers now expect all of their vehicles, homes and devices to be connected and able to be interacted with via their mobile technology from anywhere and at any time.

An increasing number of new vehicles come equipped with built-in wireless connectivity that enables connectivity to these vehicles via mobile devices and web-enabled devices for remote function actuation. Vehicles from General Motors, for example, equipped with ONSTAR telematics connectivity can be remotely started or unlocked with a smartphone running a downloaded software application ("app"). This is a proprietary, designed-in solution available only to purchasers of these vehicles and requires the purchase of an ongoing subscription from ONSTAR for the cellular data connectivity to the vehicle to enable this function.

It is generally known that vehicle electronics suppliers have been offering retrofitted systems to expand the remote control capabilities available to vehicle owners. Directed Electronics, for example, offers aftermarket systems that control more functions and provide longer-range of connectivity, including the addition of telematics communications for control from any location with a smartphone application. One primary limitation of these systems includes the need for extensive custom engineering efforts to enable the electronics to interface to and work with the electronics of the vehicles. In addition, consumers may be required to employ a professional technician for all installation efforts due to the technical complexity of the different vehicle installations. Consequently, these installations are generally expensive for consumers to consider.

More recently, suppliers of aftermarket vehicle electronics have introduced systems that consumers can self-install at low-cost and complexity. Delphi Automotive, for example, has recently introduced a system that can be plugged into a standardized on-board diagnostics (OBD-II) connector found on all light-duty vehicles since 1996. The vehicle owner can easily install the system and, after downloading a smartphone application, can have remote control of vehicle access functions from their smartphone or a web-enabled device. By leveraging features found standard in many vehicles, this system advantageously allows for the addition of a new radio-frequency (RF) transmitter to operate as a secure remote control using procedures built into the vehicle by its manufacturer. Other suppliers are attempting to reverse engineer data bus commands for each vehicle to permit long-range remote control of the functions of the vehicle by transmitting data bus commands onto the OBD-II connector from a consumer-installed device. The main limitations of the RF control technique are that many vehicles do not have any available method for adding a new transmitter by the owner. Additionally, many vehicles have such sophisticated secure RF designs that no method can be found practically to transmit the proper secure codes to a vehicle.

The main limitation of a data bus control technique is the extensive effort to reverse-engineer data bus commands for each vehicle. Additionally, many vehicles cannot be controlled via this connector at some or all of the time, such as when an owner is away from their vehicle due and/or due to a lack of available data bus commands.

U.S. Patent Publication No. 2009/0108989 A1 describes a remote control actuation system using a controller and solenoid(s) to press one or two remote control actuation buttons of a vehicle remote control. The system would be placed in a location within the confines of the vehicle. The '989 application describes an actuation method specific to a single type of remote control with a specific button location layout. The '989 application does not describe a configurable, or adaptable, system for mounting or actuating more than 2 buttons. The '989 application also fails to accommodate the numerous and widely-varying remote control multi-button designs found on vehicle remote control fobs, for example. Vehicle remote controls can have from 2 to 8 buttons in any type of layout and orientation on up to 3 surface planes of the remote control, varieties of package sizes and designs without a mechanical key blade and ones with fixed or movable mechanical key blades.

The '989 application also fails to provide for the linkage of remote control actuation to a user's mobile devices, e.g., a mobile smartphone application. Furthermore, the '989 application fails to describe a technique for blocking the vehicle detection of the remote control within the vehicle by low-frequency techniques used in vehicle immobilization or push-button engine start features. It is generally understood that vehicles and their remote controls can include a low-frequency circuitry that enables secure detection of the presence of the remote control within the vehicle. As such, blocking the RF function of the remote control and detection of the presence of the remote control can be used to prevent or alleviate the vehicle from being a target of drive-away theft.

Therefore, there is a need in the art for a remote control to control the functions of a vehicle and/or other device, specifically for a singular design for wireless connectivity enhancements of linkage to mobile devices which can be added to all existing vehicle or device remote control systems without special tools or training.

BRIEF SUMMARY

The presently disclosed embodiments, as well as features and aspects thereof, are directed towards a remote control button actuation system that includes a button actuator tip to actuate the buttons on a remote control for vehicle or device. In one embodiment of the disclosure, the button actuator tip can be moved to any position over the surface of the remote control. Once positioned over a remote control button, the button actuator tip may be lowered to press a remote control button. The servo motors may be controlled by a programmable controller that receives signals from either a mobile device via short or medium-range wireless signals or from a separate telematics gateway device which extends the range of control to the mobile device.

The various embodiments of the controller may include configurable nonvolatile memory that can provide storage of data, such as data representative of the proper positions for all buttons on an installed vehicle or device remote control. The data may be received from application software on the mobile device and derived from a photograph of the remote control or key fob taken by a camera of the mobile device when the remote control or key fob is securely positioned within a removable drawer of an outer housing. The system may be powered by an internal power supply using either internal or external batteries, or may be powered by interfacing to another power source such as a 12-volt source available in the vehicle. The removable drawer can secure the remote control in place, for actuation by the actuator. The actuation system with the remote control positioned and retained within the outer housing may be located within a vehicle in a hidden location to prevent theft. Alternatively or in addition to, the actuation system of the present disclosure can be located proximate or near the controlled device.

In accordance with another embodiment of the present disclosure, the actuation system includes a support drawer that defines an isolation enclosure that is designed to prevent radio frequency (RF) signals from entering into or leaving an open interior of the isolation enclosure. The isolation enclosure is preferably formed from a metallic material to prevent the transmission of the RF signals. The isolation enclosure completely surrounds a key fob that is located on a remote control support of the support drawer that is received within the open interior of the isolation enclosure. The remote control support drawer securely receives and retains the key fob in a known location within the open interior.

A controller of the actuation system is configured to receive command signals from a mobile device, such as a smartphone. Based upon the command signals received from the mobile device, the controller converts the command signals into position commands used to control the movement of the button actuator. Since the key fob is positioned within the isolation enclosure, a transmitting antenna is used to transmit vehicle command signals out of the outer housing for receipt by the operating systems within the vehicle.

A key fob antenna is positioned within the isolation enclosure to receive the control signals generated by the key fob and to communicate these signals to the controller. Based upon the received signals from the key fob, the transmitter retransmits the control signals received from the key fob as the vehicle command signals. In this manner, the actuation system is able to isolate the key fob and controller from outside RF signals while still allowing the key fob and controller to transmit vehicle command signals to the vehicle.

BRIEF DESCRIPTION OF THE SEVERAL VIEWS OF THE DRAWING

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Aspects, features and advantages of several exemplary embodiments of the remote button actuation system will become better understood with regard to the following description in connection with the accompanying drawing(s). It should be apparent to those skilled in the art that the described embodiments of the present description provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present description as defined herein and equivalents thereto. Hence, use of absolute terms such as, for example, "will," "will not," "shall," "shall not," "must" and "must not" are not meant to limit the scope of the present description as the embodiments disclosed herein are merely exemplary.

The word "exemplary" is used herein to mean "serving as an example, instance, or illustration." Any aspect described herein as "exemplary" is not necessarily to be construed as exclusive, preferred or advantageous over other aspects.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Figure 1:
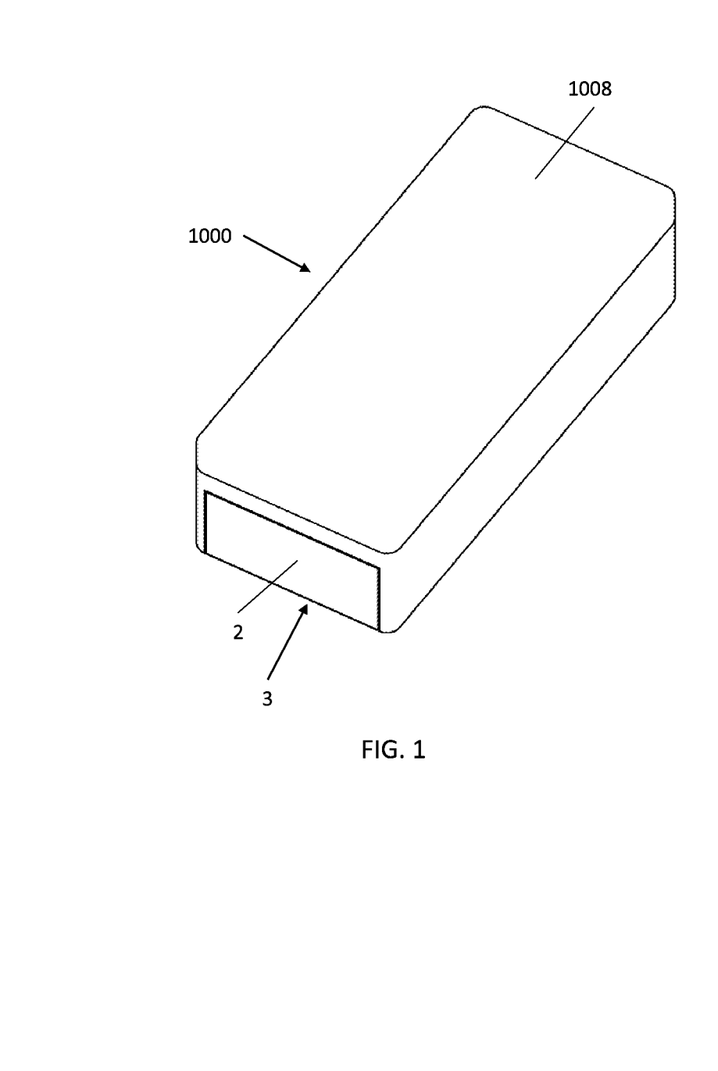
FIG. 1 is a top isometric view of the remote control button actuation system of the present disclosure.
Figure 2:
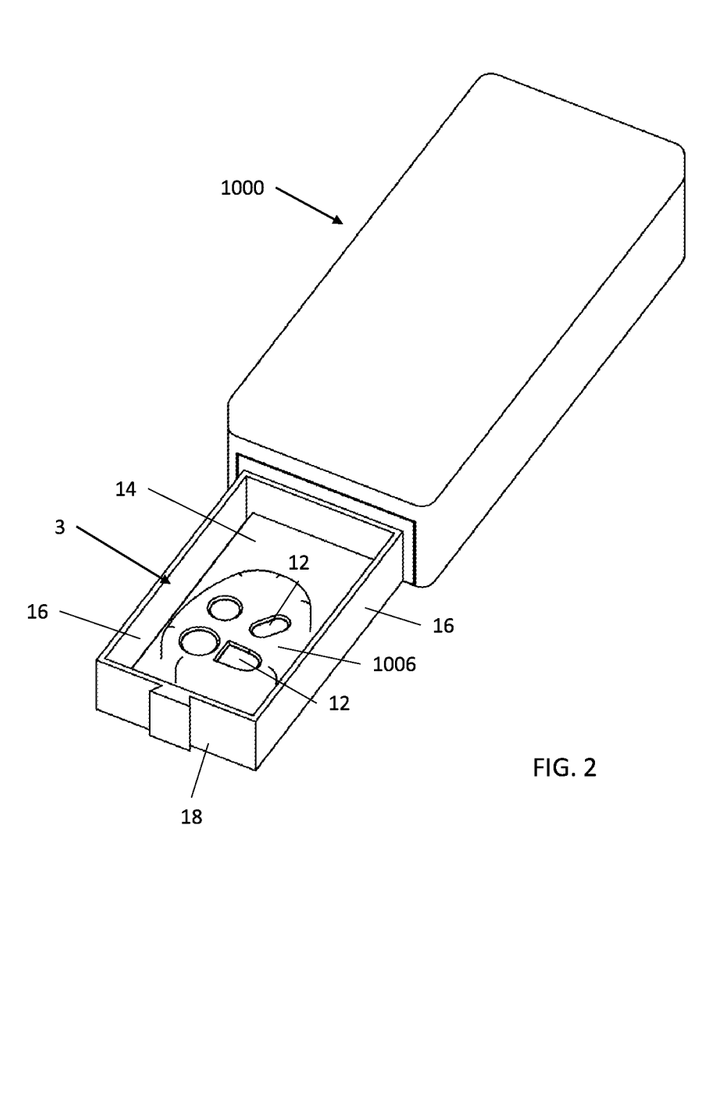
FIG. 2 is a top isometric view showing the key fob drawer extended from the drawer housing.

FIG. 1 illustrates an actuation system 1000 used to actuate a remote control and constructed in accordance with the present disclosure. The actuation system 1000 shown in FIG. 1 includes an outer housing 1008 that is formed in two separate sections as will be described below. The outer housing 1008 defines an open interior that receives a removable key fob drawer 3, which is shown in the retracted position in FIG. 1 and in the extended position in FIG. 2. The key fob drawer 3 is sized to receive a key fob 1006 that includes a series of individual buttons 12 that can be separately depressed to send wireless command signals to a vehicle. As an example, the buttons 12 can be used to lock the car doors, unlock the car doors, start the engine, open the trunk, send a panic signal or perform other functions depending upon the configuration of the key fob 1006. Although one specific configuration of a key fob 1006 is shown in FIG. 2, it should be understood that various other configurations of the key fob 1006 are contemplated as being within the scope of the present disclosure.

The key fob 1006 is shown positioned on a floor 14 of the drawer 3. It is contemplated that the floor 14 could include one or more sticky pads that allow the key fob 1006 to be securely held in the position as shown in FIG. 2. The key fob drawer 3 includes a series of side walls 16 and a front wall 18. The front wall 18 can receive a removable door cover 2 that forms part of an isolation enclosure as will be described.

Figure 3:
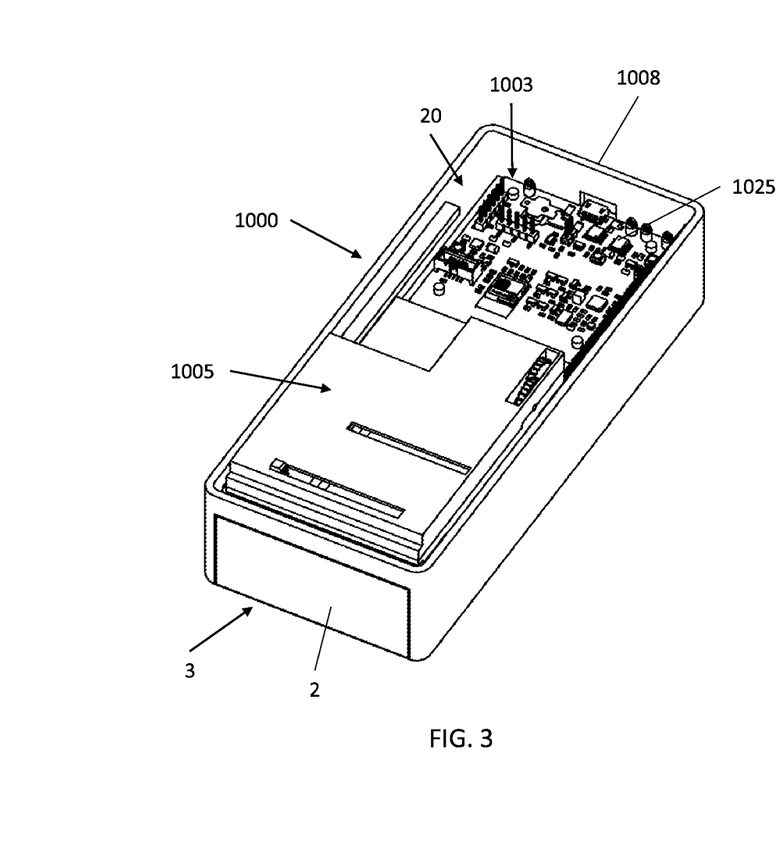
FIG. 3 is a view of the remote control button actuation system with the top cover removed.

FIG. 3 is an illustration of the actuation system 1000 with the top portion of the outer housing 1008 removed to illustrate the operating components contained within the outer housing 1008. Included within the open interior 20 is a three axis button actuator 1005, an inertial sensor 1025 and a controller/power supply 1003. The actuator 1005 is operable to move a plunger in the x, y and z axes such that the movable plunger can be accurately positioned above any one of the multiple buttons 12 on the key fob 1006 when the key fob 1006 is positioned within the key fob drawer 3. The three axis button actuator 1005 communicates with the controller 1003 that is operable to control the x, y position of the plunger and the movement of the plunger in the z direction. One example embodiment of the three axis button actuator 1005 and controller 1003 is shown and described in U.S. Pat. No. 9,576,414, the disclosure of which is incorporated herein by reference. Further details of the interaction between the controller 1003 and actuator 1005 will be described in greater detail below with reference to FIG. 10.

Figure 4:
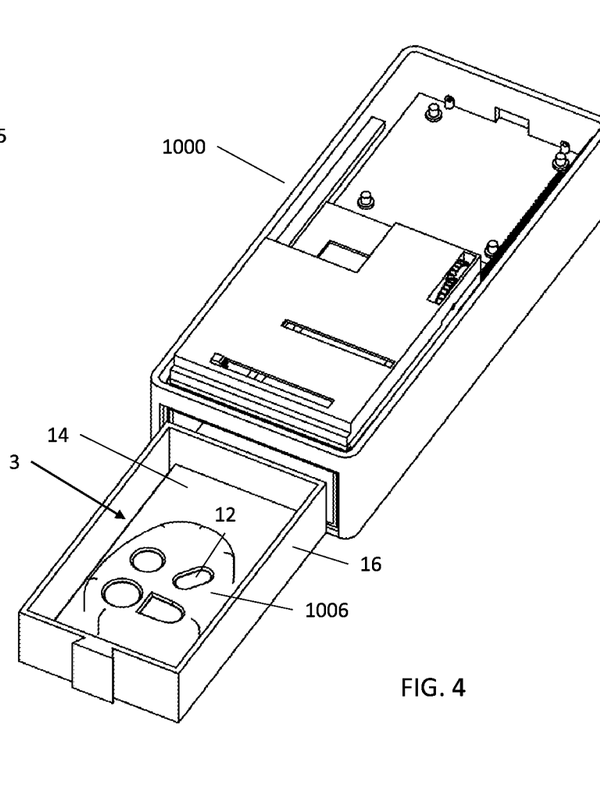
FIG. 4 is a view similar to FIG. 3 with the key fob drawer extended.

FIG. 4 is a view similar to FIG. 3 in which the key fob drawer 3 is in the extended position. When the key fob drawer 3 is in the extended position, the user can take a photo of the key fob 1006 located within the drawer 3 utilizing a mobile device, such as a smartphone, that is running application software. The application software on the smartphone processes the image to define the x and y positions of the center of each button 12 relative to the key fob drawer 3. The location of each button 12 is determined based upon reference points of the drawer that are present in the photograph. The photograph of the key fob 1006 within the key fob drawer 3 is taken with the drawer in the extended position shown in FIG. 4. It is contemplated that the reference point in the drawer 3 could be reflective areas or markings on the floor 14 or the side walls 16 that allows the position of the key fob 1006 to be accurately identified.

Once the location of the key fob 1006 is identified within the drawer 3, this information is used to create location identification information which is sent from the application software on the smartphone to the controller located within the actuation system 1000.

After the location of the key fob is identified utilizing the application software on the smartphone, the drawer 3 is retracted into the position shown in FIG. 3. The drawer 3 retracts to a known and physically defined location within the outer housing 1008. Since the location of the key fob 1006 is known relative to the floor 14 of the drawer 3 and the location of the drawer is also known within the outer housing 1008 and thus relative to the three-axis button actuator 1005, the controller can then operate the three-axis button actuator 1005 to position the plunger above any of the selected buttons 12 on the key fob 1006.

The z position (i.e. height) of any key fob button 12 can be determined using one of multiple different location methods. In the first contemplated method, the plunger is positioned above any one of the selected buttons 12 based on the known x, y position. Once in position, a servo motor of the actuator 1005 is actuated to move the plunger vertically toward the key fob button. Once the plunger contacts the button on the key fob, the current drawn by the servo motor will increase due to the resistance of the button to further vertical movement of the plunger. Once this increase of motor current is sensed, the location of the plunger is stored and the z-position of the key fob 1006 and button on the key fob 1006 will be defined.

In a second embodiment, the plunger is positioned above any one of the selected buttons 12 on the key fob and the servo motor is activated to move the plunger vertically toward the selected button. Once the controller detects the transmission of the key fob signal with a RF receiver, the position of the plunger is recorded within memory. The key fob 1006 will generate the RF signal only when the contact tip of the plunger fully depresses the key fob button.

Figure 5:
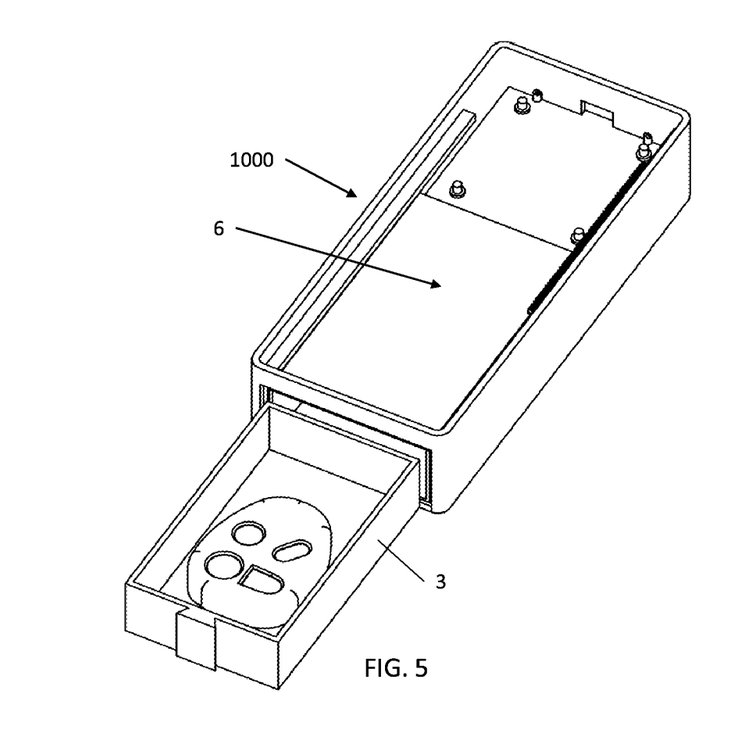
FIG. 5 is a view similar to FIG. 4 with components removed and an isolation cover in place.
Figure 6:
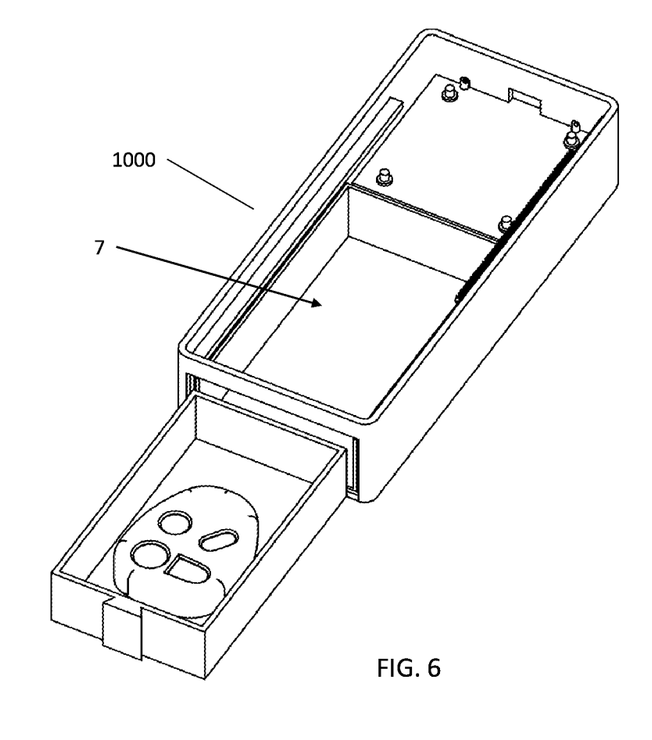
FIG. 6 is a view similar to FIG. 5 with additional components removed.
Figure 7:
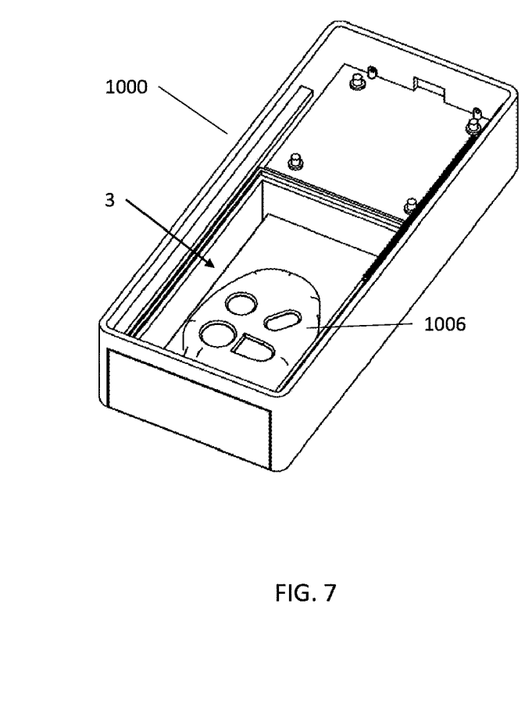
FIG. 7 is a view similar to FIG. 6 with the key fob drawer retracted.

Referring now to FIG. 5, the key fob drawer 3 is closed by sliding the drawer 3 fully into the drawer housing assembly 6. The drawer housing assembly 6 is designed to create part of an isolation enclosure, such as a Faraday cage, for blocking all RF signals into or out of the drawer housing assembly 6 when the drawer 3 is received within the drawer housing assembly 6. The removable drawer cover 2 shown in FIG. 1 is also formed from a metallic material to define a portion of the isolation enclosure (Faraday cage) when the key fob drawer 3 is in the retracted position shown in FIG. 1.

Figure 8:
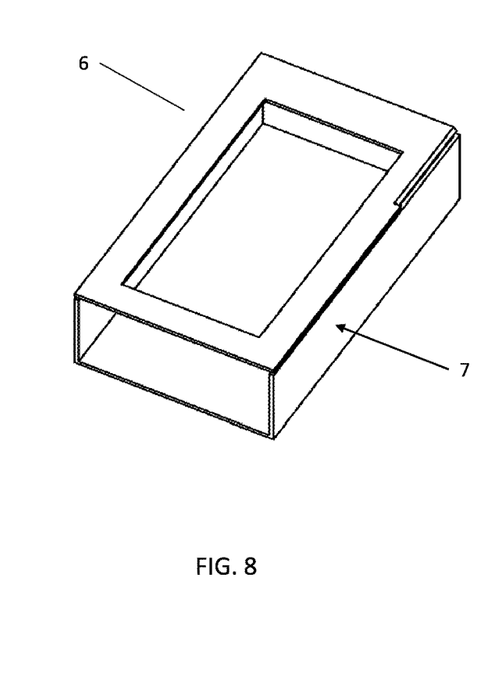
FIG. 8 is a perspective view of the drawer housing base.
Figure 9:
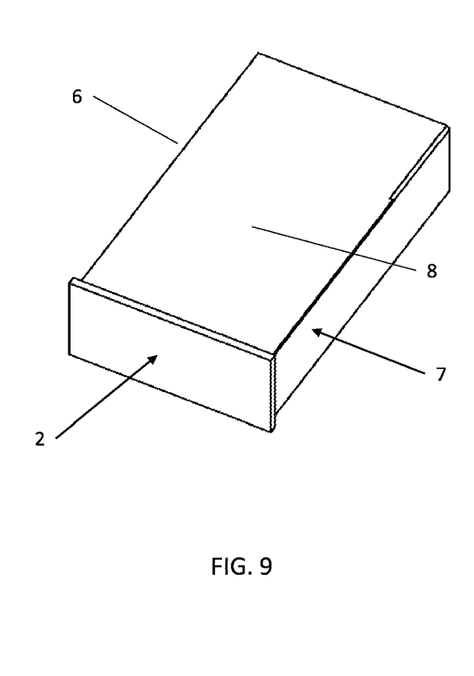
FIG. 9 is a view of the drawer housing assembly that defines the Faraday cage.

Referring now to FIGS. 8 and 9, in the embodiment shown the drawer housing assembly 6 includes a frame 7 and a flexible cover 8 mounted over a top portion of the frame 7. The flexible cover 8 is formed from a metallized, flexible material which permits the plunger of the three-axis button actuator 1005 to deflect the flexible cover 8 against the key fob buttons when the key fob and drawer are received within the frame 7. In this manner, the entire drawer housing, including the drawer 3, forms part of the isolation enclosure (Faraday cage) while also allowing the three-button actuator 1005 to depress the buttons 12 formed on the key fob 1006.

In another contemplated embodiment, the key fob drawer 3 could be designed to incorporate mechanical levers to translate the downward z-axis movement of the plunger into lateral or upward movement to accommodate key fobs 1006 that utilize either a side button or a button on the opposite face of the key fob 1006. Such mechanical embodiments could be similar to those shown and described in U.S. Pat. No. 9,576,414, the disclosure of which is incorporated herein by reference.

During the initial placement of the key fob 1006 within the key fob drawer 3, the key fob 1006 will be positioned by the user against the mechanical levers to create the necessary button pressing action which is created by the downward z-axis motion. In this way, the system of the present disclosure would function to operate selected buttons on the front, side and rear faces of a key fob.

In addition to the features described above, it is contemplated that the actuation system 1000 of the present disclosure could include one or more inertial sensors 1025 (FIG. 10) to enhance the operation of the system. As an illustrative example, one or more accelerometers (3-axis) and, optionally, gyroscope sensors, could be mounted within the outer housing 1008 and communicate with the internal controller 1003. The accelerometers and gyroscope sensors would communicate with the controller and generate alarm signals upon sensing small amounts tilting to the vehicle after the vehicle has been stationary for an extended period of time. The tilting of the vehicle may be caused by the vehicle being jacked up to steal tires, wheels, catalytic converters or any other component. Once the controller contained within the outer housing 1008 senses the tilting of the vehicle, the controller can cause the 3-axis button actuator 1005 to depress a panic/emergency button contained on many vehicle key fobs. Depressing the panic button causes the alarm system of the vehicle to activate in hopes of deterring theft.

In another contemplated embodiment, if the actuation system is connected to the cloud utilizing either internal or external cellular, Wi-Fi or Bluetooth communication techniques, an alert could be sent to the owner utilizing the cloud platform. The owner would then be able to contact authorities or take required action to prevent the theft while it is occurring.

Figure 10:
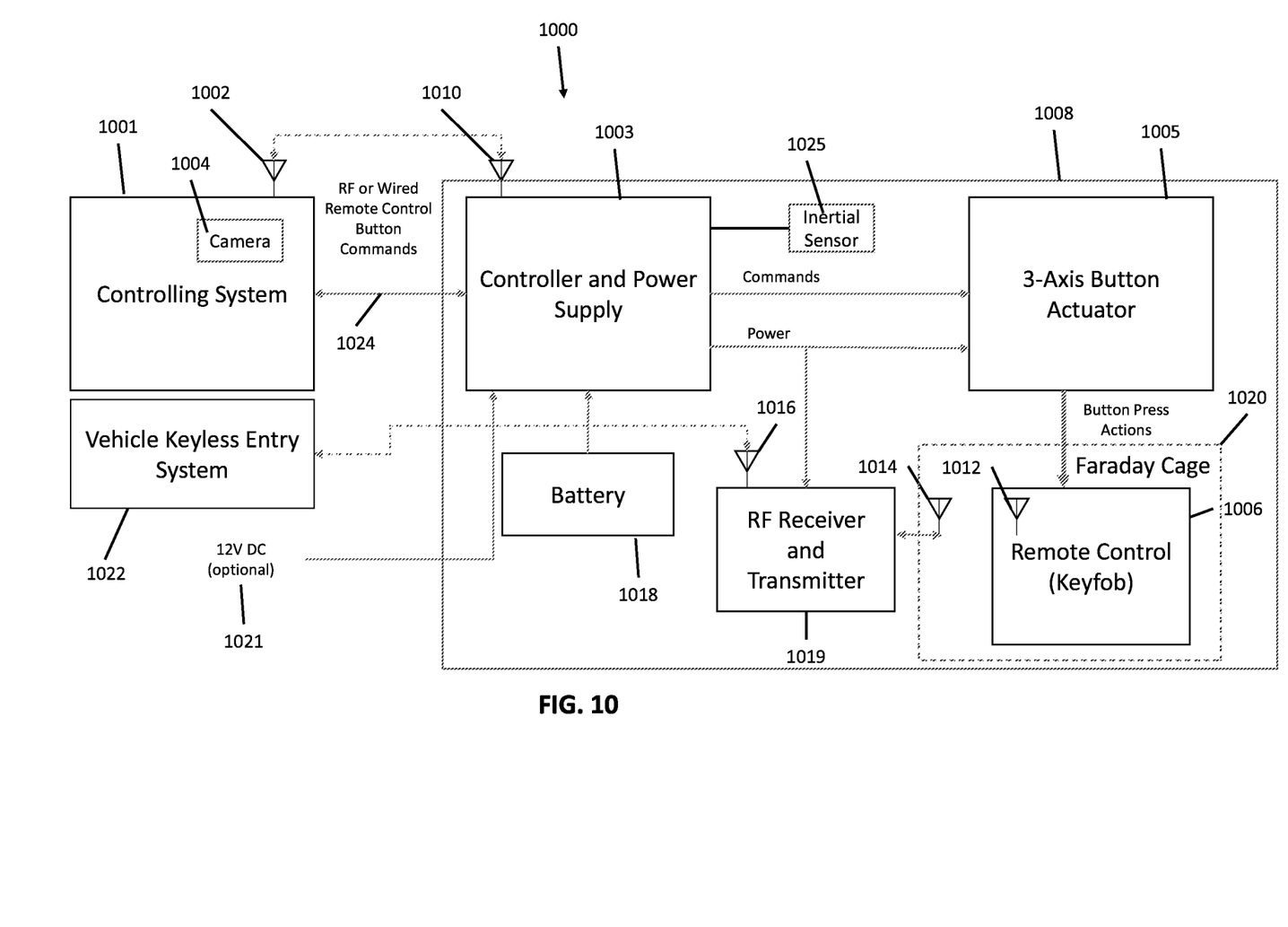
FIG. 10 is a mechanization diagram showing exemplary components of an exemplary embodiment of the remote button actuation system.

FIG. 10 illustrates a mechanization diagram of the remote control button actuation system 1000 in accordance with an exemplary embodiment of the present disclosure. In the embodiment shown in FIG. 10, the controlling system 1001 may be a mobile device, such as a smartphone, which operates to send user commands via wireless RF through antenna 1002 or other wireless technology, including optical and audible technology, to the controller 1003. As indicated previously, the smartphone controlling system 1001 includes a camera 1004 that can be used to take a picture of the key fob 1006 when the key fob 1006 is located in the key fob drawer 3. The photograph taken by the camera 1004 is used by the application software on the mobile device (smartphone) to calculate the button locations within the key fob drawer 3. The calculated button locations are wirelessly transmitted to the controller 1003 using a wireless communication technique, where the button locations are stored in nonvolatile memory. Alternatively, the controlling system 1001 could communicate the calculated button locations to the controller 1003 through a wired connection, such as shown by reference numeral 1024. In another contemplated embodiment, the controller 1003 could receive the actual photograph from the mobile device that serves as the controlling system 1001 and calculate the button locations.

As described above, once the key fob 1006 is initially positioned within the drawer 3 and the drawer is closed, the controller 1003 activates the plunger of the three-axis button actuator 1005 to move the plunger in a vertical direction to detect the vertical position of the key fob. This detection can be done utilizing either an increase in the servo motor current created by the physical contact between the plunger and the button or by detecting the transmission of a signal from the key fob 1006 upon full depression of the key fob button. In either case, the z-position of the key fob 1006 within the drawer is determined and stored in the nonvolatile memory.

When the controller 1003 receives a command from a user through the mobile device, the controller 1003 accesses the stored location information for each of the buttons 12 of the key fob 1006. The controller 1003 converts the known location of the key fob buttons and the received command from the mobile device into specific servo motor commands that cause the provision of actuating power to the three-axis button actuator 1005. The three-axis button actuator 1005 moves the plunger into the proper x, y position and moves the plunger in the z direction, which then presses the selected remote control button on a remote control device, such as a key fob 1006. Although a key fob 1006 is shown in the drawing figures, the remote control device could be any other type of RF remote, such as a home security remote, a garage door remote or other types of remote control devices. In the embodiment illustrated in FIG. 10, the controller 1003, actuator 1005 and key fob 1006 are all contained within the outer housing 1008.

As illustrated in FIG. 10, a receiving antenna 1010 receives control commands from the mobile device of the controlling system 1001. The receiving antenna 1010 allows RF signals to be received from the mobile device. The receiving antenna 1010 is used by the controller 1003 to receive wireless commands from the controlling system 1001. It is contemplated that the receiving antenna 1010 could be a Bluetooth or other short-range antenna that is able to communicate with the controlling system 1001, such as a mobile device.

When the controller 1003 receives the command from the controlling system 1001, the controller 1003 generates motor commands which are relayed to the three-axis button actuator 1005. The actuator 1005 converts the commands to actuate a series of servo motors, which cause an actuator tip of the actuator 1005 to press one or more buttons on the key fob 1006.

In a contemplated, alternate embodiment the controller 1003 could includes a separate cellular transceiver (not shown) that would allow the controller 1003 to receive commands directly from a cellular network, from either the controlling system 1001 or from a remote server. The use of a separate cellular transceiver would extend the range of the controlling system 1001 as compared to the relatively short range transceivers (i.e. Bluetooth). In this manner, the cellular transceiver would extend the communication range of the controlling system 1001, which in many cases will be a smart phone.

When the key fob button is pressed, the key fob 1006 generates an RF vehicle command signal from the internal key fob antenna 1012 in a conventional manner. Since the key fob 1006 is contained within the isolation enclosure 1020, such as the Faraday cage, the vehicle command signal sent from the key fob antenna 1012 is isolated and is not directly received by the operating components within the vehicle.

In the shown embodiment, the command signal from the key fob antenna 1012 is received by a relay antenna 1014 that can transmit outside of the isolation enclosure 1020. The vehicle command signals are relayed to the RF receiver and transmitter 1019 that is also located outside of the isolation enclosure 1020. The RF receiver and transmitter 1019 include an antenna 1016 that wirelessly communicates with the keyless entry system 1022 of the vehicle. The transmitting antenna 1016 is positioned such that the controller 1003 is able to transmit RF vehicle command signals out of the outer housing 1008 for receipt by the vehicle's keyless entry and/or keyless ignition system 1022.

In the embodiment shown in FIG. 10, the controller 1003 is powered by an internal battery 1018. However, it is contemplated that the controller 1003 could also receive power from a 12-volt DC power source 1021, such as a vehicle battery.

Since the entire remote control button actuation system 1000 shown in FIG. 10 is self-contained, the actuation system 1000 could be located at various different locations within a vehicle as long as the transmissions from the transmitting antenna 1016 are strong enough to reach the vehicle's keyless entry and keyless starting systems.

The RF receiver and transmitter 1019 serve two purposes: 1) to enable receiving key fob transmissions (315-980 MHz), amplifying them and retransmitting them to the vehicle for each of the button press commands and 2) to optionally enable vehicle low-frequency RF transmissions for passive keyless functions (i.e. passive engine start) to be received by the key fob. As an alternate method of allowing low-frequency RF transmissions to be received by the key fob, a mechanical door in the isolation enclosure 1020 could be opened by a motorized control or as a function of the 3-axis button actuator 1005 pressing against a dedicated door open/close.

The actuator 1005 shown in FIG. 10 is contained within the outer housing 1008 and used to press the required and desired button on the remote control key fob 1006. Although the present disclosure contemplates the remote control as being a key fob 1006, it should be understood other types of remote control systems could be utilized while operating within the scope of the present disclosure.

As can be understood in the embodiment shown in FIG. 10, the actuator 1005 can be of various different configurations for activating control buttons on different types of remote control devices, not just the key fob shown in the figures. The actuator, controller and internal power supply, along with the remote control device, are contained within the outer housing 1008. The controller will include an internal antenna to receive signals from the remote control device and will include an external antenna to transmit these signals to the vehicle. The purpose for this isolation of the internal remote control device from any external RF signals is to prevent any interaction with vehicle transmitting RF antennas or attempts by thieves to perform a "man-in-the-middle" amplification attack. The isolation enclosure 1020 will block any incoming RF transmissions and the only outgoing RF transmissions would be retransmissions by the controller 1003 and an antenna external to the vehicle.

I claim:

1. An actuation system to actuate one or more buttons on a remote control based on command signal generated by a mobile device, the actuation system comprising:
   an outer housing;
   an isolation enclosure including a remote control support drawer that is movable into and out of the outer housing and configured to securely receive the remote control and securely retain the remote control in a fixed position relative to the support drawer as the support drawer moves into and out of the outer housing;
   a controller configured to receive the command signal from the mobile device and convert the command signal into position commands; and
   a button actuator configured to receive the position commands from the controller and activate the one or more buttons on the remote control when the support drawer is received fully within the outer housing.

2. The actuation system of claim 1, wherein the remote control includes a plurality of buttons, wherein the mobile device is configured to transmit wireless command signals corresponding to the plurality of buttons.

3. The actuation system of claim 1 wherein the mobile device includes a camera operable to generate an image of the remote control on the support drawer.

4. The actuation system of claim 3 wherein the mobile device includes application software to convert the image of the remote control within the drawer into location coordinates.

5. The actuation system of claim 4 wherein the controller receives the location coordinates from the mobile device.

6. The actuation system of claim 1 wherein the isolation enclosure is configured to prevent radio frequency (RF) signals from reaching the remote control from outside of the isolation enclosure when the support drawer is received fully within the outer housing.

7. The actuation system of claim 6 wherein the isolation enclosure is formed from a metallic material.

8. An actuation system to actuate one or more buttons on a remote control device based on wireless command signals generated by a mobile device, the actuation system comprising:
   a outer housing defining an open interior;
   a remote control support drawer moveable into and out of the outer housing, the support drawer configured to securely receive and retain the remote control device in a fixed position relative to the support drawer as the support drawer moves into and out of the outer housing, the support drawer configured to create an isolation enclosure when the support drawer is received fully within the outer housing to prevent radio frequency (RF) signals from entering into or leaving the open interior;
   a controller located within the open interior and configured to receive the command signals from the mobile device and convert the command signals into position commands; and
   a button actuator including a movable plunger having an actuation tip, the button actuator being configured to receive the position commands from the controller and move the actuation tip to a position associated with the one of buttons and to move the actuation tip to engage the one button of the remote control device when the support drawer is received fully within the outer housing.

9. The actuation system of claim 8, wherein the remote control includes a plurality of buttons, wherein the mobile device is configured to transmit wireless command signals corresponding to the plurality of buttons.

10. The actuation system of claim 9, wherein the controller is operable to receive the wireless command signals from the mobile device and cause the button actuator to operate based on the received wireless command signals.

11. The actuation system of claim 8 wherein the mobile device includes a camera operable to generate an image of the remote control on the support drawer.

12. The actuation system of claim 11 wherein the mobile device includes application software to convert the image of the remote control within the drawer into location coordinates.

13. The actuation system of claim 12 wherein the controller receives the location coordinates from the mobile device.

14. The actuation system of claim 8 wherein the isolation enclosure is formed from a metallic material.

15. The actuation system of claim 8 further comprising:
   a relay antenna located within the isolation enclosure to receive command signals from the remote control device when the remote control device is located within the isolation enclosure;
   a re-transmission device connected to the relay antenna to receive the command signals and re-transmit the command signals, wherein the re-transmission device is located outside of the isolation enclosure.

16. The actuation system of claim 15 wherein the remote control device is a key fob of a vehicle operable to generate vehicle command signals.

17. The actuation system of claim 16 wherein the re-transmission device transmits the vehicle command signals from the key fob to the vehicle.

18. The actuation system of claim 8 further comprising one or more inertial sensors positioned within the outer housing and in communication with the controller, wherein the inertial sensor is operable to sense tilting of the outer housing.

19. The actuation system of claim 18 wherein the controller is operable to cause the button actuator to depress a button on the remote control device upon sensing of tilting of the vehicle.

20. The actuation system of claim 2, wherein the controller is operable to receive the wireless command signals from the mobile device and cause the button actuator to operate based on the received wireless command signals.

* * * * *